United States Patent [19]

Kumpf

[11] Patent Number: 5,029,815
[45] Date of Patent: Jul. 9, 1991

[54] CABLE GUIDE ARRANGEMENT

[75] Inventor: Erich Kumpf, Esslingen, Fed. Rep. of Germany

[73] Assignee: Ursula Kumpf, Esslingen, Fed. Rep. of Germany

[21] Appl. No.: 401,452

[22] PCT Filed: Mar. 16, 1988

[86] PCT No.: PCT/EP88/00209
  § 371 Date: Nov. 16, 1988
  § 102(e) Date: Nov. 16, 1988

[87] PCT Pub. No.: WO88/07280
  PCT Pub. Date: Sep. 22, 1988

[30] Foreign Application Priority Data

Mar. 18, 1987 [DE] Fed. Rep. of Germany ....... 8704051
Feb. 13, 1988 [DE] Fed. Rep. of Germany ....... 3804604

[51] Int. Cl.$^5$ .............................................. B65H 59/00
[52] U.S. Cl. ............................................ 254/134.3 FT
[58] Field of Search ............... 254/134.3 FT, 134.5 R; 15/104.3 SN; 174/135

[56] References Cited

U.S. PATENT DOCUMENTS 4,793,594 12/1988 Kumpf ....................... 254/134.3 FT

FOREIGN PATENT DOCUMENTS 3231027 3/1983 Fed. Rep. of Germany .
3217401 11/1983 Fed. Rep. of Germany .
3427788 2/1986 Fed. Rep. of Germany .
WO/8600283 1/1986 PCT Int'l Appl. ........ 254/134.3 FT
5707/67 8/1968 Switzerland ............... 254/134.3 FT Primary Examiner—Robert C. Watson
Attorney, Agent, or Firm—Jones, Tullar & Cooper

[57] ABSTRACT

The invention relates to a cable guide arrangement for the combined laying and guiding of copper cables or the like and light-conducting cables. The arrangement includes a cable duct and a cable guide unit having two cable guide pipes connected side-by-side to one another. The two cable guide pipes are rigidly connected to one another to provide a partition floor within the cable duct. The width of the partition floor is less than the internal diameter of the cable duct, and is such that the partition floor is movable within the cable duct so as to divide the space within the cable duct into two variable cable receiving spaces. The cable receiving spaces are varied so as to prevent a cable laid in one of the spaces from becoming jammed between the internal wall of the cable duct and the adjacent outer surface of a guide pipe.

6 Claims, 3 Drawing Sheets

CABLE GUIDE ARRANGEMENT

DESCRIPTION OF THE INVENTION

The present invention relates to a cable guide arrangement for, in particular, combind laying and guiding of copper cables or the like and light-conducting cables, comprising a cable duct of concrete, earthenware, plastic or the like, and a cable guide unit made from plastic material and which may be introduced into the empty cable duct by pulling.

In a cable guide arrangement of this type, for example that known from German Patent Specification No. 32 17 401 C2, the two side cable guide pipes of the cable guide unit are connected to the two sides of a central cable guide pipe of larger diameter in a flexible manner such that the individual cable guide pipes may be drawn simultaneously into the empty cable duct in a similar manner to a bundle of cable guides. The interior of the cable duct is thereby substantially filled. In this manner the desired multiple use is made of the cable duct, which is empty, that is to say in which no cable has yet been laid, but the cable receiving space in the cable duct has a fixed cross section determined by the extrusion of the cable guide unit. This means that already at the time at which the cable duct is divided into several cable receiving spaces, the maximum cable diameters of the cables to be laid in the future must be decided. This is a problem, in particular when normal copper cables are to be subsequently laid, because they may have a large range of diameters, depending on the number of pairs of signal wires in the case of communications cables, or depend on the voltage or load which has to be carried in the case of power cables.

SUMMARY OF THE INVENTION

An object of the present invention is to provide a cable guide arrangement of the type mentioned above, in which the cable receiving spaces are variable to allow the cable duct to be used in multiple different ways.

To solve this problem a cable guide arrangement of the type mentioned above is provided with the following combination of features: the two cable guide pipes are rigidly connected to one another to provide a partition floor; the width of the partition floor is smaller by a given amount than the internal diameter of the duct; and the given amount is selected so that the partition floor is movable within the duct to divide the latter into two widely variable cable receiving spaces so as to prevent a cable, which is to be subsequently laid in one of the variable cable receiving spaces, from becoming jammed between the internal wall of the duct and the adjacent outer region of the corresponding lateral cable guide pipe of the partition floor.

With the cable guide arrangement according to the invention it is possible to subsequently lay a cable or cables, adjacent the two cable guide pipes of fixed diameter which are used, for example, for light-conducting cables, the two further cable receiving spaces being suitable for the diameter of the or each cable to be subsequently laid.

It is therefore, for example, possible by the division of the duct with the help of the partition floor into either upper and lower or right and left cable receiving spaces respectively, depending on the orientation of the partition floor, to insert cables of approximately the same diameter or cables of very different diameters. The partition floor, due to its mobility within the duct, allows itself to be appropriately deflected and thereby makes available the appropriate space for the cable which is to be pulled through. In this way, therefore, it is also possible, for example, in a cable duct of the type widely used in Germany having an internal diameter of 100 mm to make one of the cable receiving spaces available for a copper cable of from 50 to 60 mm in diameter A further advantage is that the cable receiving spaces are available also for the insertion of a bundle of cables, or for insertion of a bundle of cable guide pipes for thin cables. In this way the cable guide arrangement according to the invention is suitable for a very wide variety of different applications. While it is known from German Patent Specification No. 34 27 788 C1 to rigidly connect the two side cable guide pipes to one another to make a partition floor, nevertheless even with this known arrangement it is only possible to make two cable receiving spaces of essentially fixed cross section within the cable duct. Because this known partition floor is constructed so as to be capable of being pushed into a duct in which a cable is already laid, the partition floor must be very rigid in both the longitudinal and transverse directions, but must nevertheless be capable of flexing along its longitudinal axis, so that is can slide through the duct along the cable which has already been laid, and it must be manufactured from a plastic material which has a relatively low frictional coefficient, so that insertion is possible over long distances of several hundred meters. This means that the partition floor must be made from a special relatively expensive plastic material with an appropriate wall thickness. By contrast, the partition floor in accordance with the cable guide arrangement of the invention is pulled into an empty duct, so that the material to be used does not have high requirements with regard to frictional coefficient and with regard to stiffness and therefore wall thickness. This means that the partition floor can be manufactured substantially less expensively from a cheaper standard plastic material or even from a plastic material obtained from a recycling process.

The connection between the two side cable guide pipes of the cable guide unit or the connection element which is provided for this purpose may be constructed in many different ways. A particularly simple connection element is that according to which the two side cable guide pipes are connected to one another by a flat web With an embodiment characterized in that the two side cable guide pipes of the partition floor are connected to one another by a web provided with one or more ribs on the upper and/or lower faces thereof, or in that the two side cable guide pipes of the partition floor are connected to one another by a web provided with perpendicularly projecting fins on the upper and/or lower faces, the cable or cables which is or are to be subsequently pulled through between the partition floor and the duct can slide more easily along the partition floor in the region of the connection element.

With a construction characterized in that the two side cable guide pipes of the partition floor are connected to one another by at least one further cable guide pipe of smaller diameter, or in that the two side cable guide pipes of the partition floor are connected to one another by two spaced apart webs between which are arranged at least two further cable guide pipes, characterized in that the connecting element arranged between the two side cable guide pipes is offset relative to the connection axis of the cable guide pipes, at least one further cable receiving space is provided for a light-conducting cable, or the possibility is offered of including one or more of these light-conducting cables during extrusion of the partition floor.

With an embodiment, a particularly optimum use is made of the variable cable receiving spaces which are available.

BRIEF DESCRIPTION OF THE DRAWINGS

Further particulars of the invention can be learned from the following description, in which the invention is described and explained in more detail with reference to the embodiments illustrated in the drawings. These show.

DESCRIPTION OF THE PREFERRED EMBODIMENTS

Figure 1:
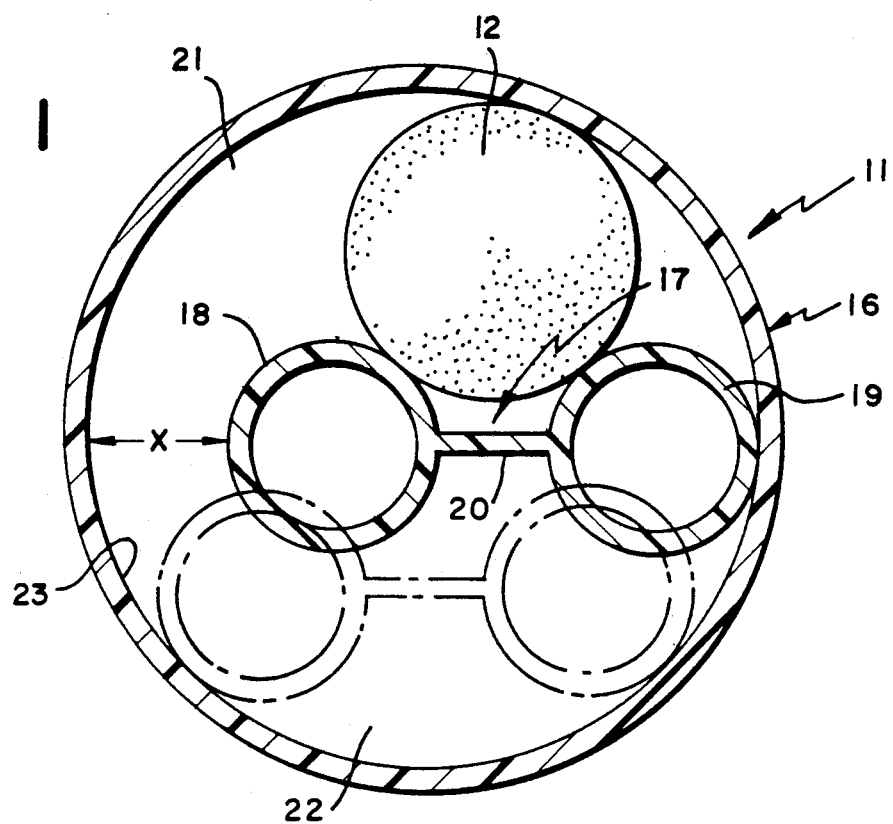
FIG. 1: which is a schematic cross section of a cable guide arrangement in accordance with a first embodiment of the present invention.

The cable guide arrangements 11 to 11f shown in the various embodiments illustrated in the drawings serve, in particular, for a combination of retrospectively fitting and guiding copper cables or the like and light-conducting cables 13, allowing cable receiving spaces 21, 22 of different dimensions to be achieved, particularly for the copper cables 12, so that cables 12 of different diameters may be fitted in the cable guide arrangements 11 to 11/f.

In the first embodiment of the present invention illustrated in FIG. 1 the cable guide arrangement 11 comprises a cable duct 16 of a fixed internal diameter. Nowadays, cable protection ducts 16 made exclusively of plastic material, are laid underground individually or in bundles, and have for example an internal diameter of 100 mm. Previously laid cable ducts 16 could be of concrete, earthenware, or the like. Such cable ducts 16 are laid, for example, for telephone cables in lengths of several 10's to a few hundred 100 m between access shafts. For multiple use of such a cable duct 16 the cable arrangement 11 includes a cable guide unit in the form of a partition floor 17, which is inserted with the assistance of a hauling line or the like, into the cable duct 16 which is empty, that is in which no cable has yet been laid.

The partition floor 17 is extruded integrally from a plastic material, such as for example PVC or a plastic material obtained from recycled material. The partition floor 17 comprises two side cable receiving pipes 18 and 19 connected substantially rigidly to one another by a web 20 which is flat on both faces. The web 20 in the form of a ribbon shaped central region is disposed generally centrally of the connecting axes of the two side pipes 18, 19. Although the partition floor 17 is of inflexible construction in the transverse direction, it is nevertheless advantageously sufficiently flexible in the longitudinal direction to enable it to be coiled, such that it can be taken up on a drum, so that after completion of pulling through a cable duct 16 it can be cut appropriately.

The width of the partition floor 17, which is of uniform width over its entire length, is slightly smaller than the internal diameter of the cable duct 16. To illustrate the relative dimensions, in FIG. 1 the partition floor 17 is shown in full lines located in the middle of the cable duct 16, although of course in an empty cable duct 16 the partition floor would lie, as illustrated in dashed lines, in the lower region thereof, either horizontally or slightly inclined. The amount X shown in FIG. 1 by which the width of the partition floor 17 is smaller than the internal diameter of the cable duct 16 is chosen such that the partition floor 17 is movable within the cable duct 16 in such a way that the cable receiving spaces 21 and 22 provided between the partition floor 17 and the cable duct internal wall 23 can be varied over a wide range, as may be seen from the location of the partition floor 17 shown in dashed lines in FIG. 1 which may be compared for example with that shown in FIGS. 2 and 3. In other words, the partition floor 17 can be brought into and held in any desired location in the cable duct 16 by a cable 12 being pulled therethrough, because during insertion of the cable 12 the partition floor makes way for or lies on top of the cable 12 being inserted. The amount X is also specified so that the external diameter of the smallest cable 12 which may be expected to be inserted is greater than the amount X, so that jamming of such a cable 12 in the gap between the cable duct internal wall 23 and the adjacent external region of the cable guide pipe on the corresponding side is not possible during insertion of the cable 12. The amount X may for example lie in the range between 10 and 25 mm.

Figure 2:
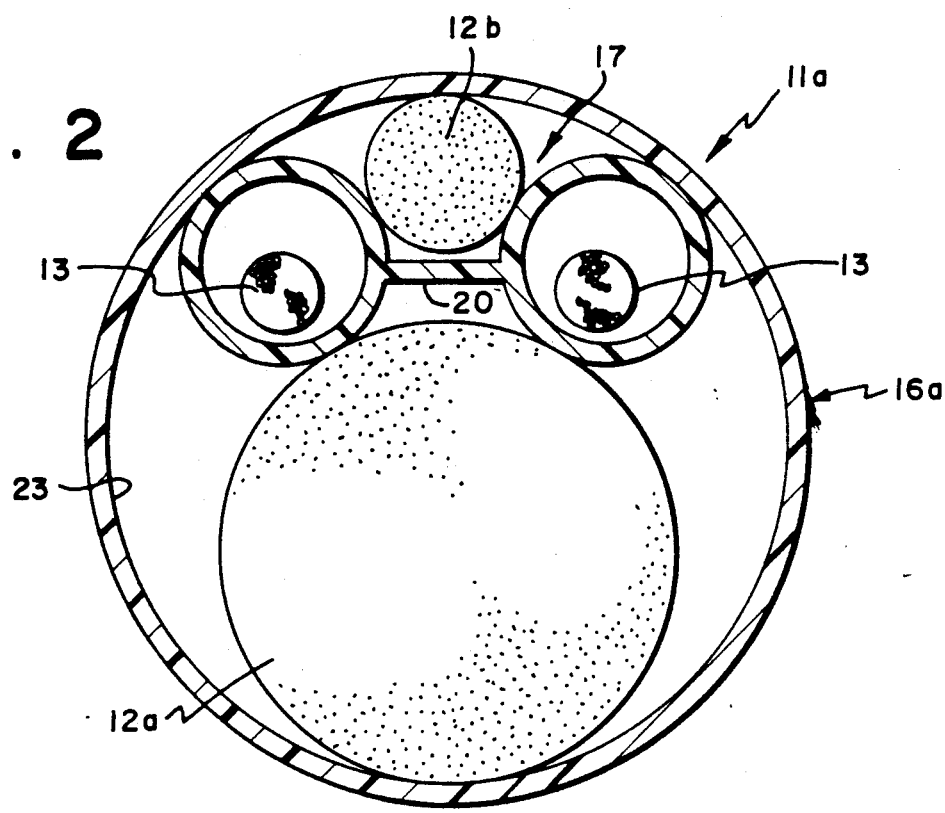
FIG. 2: which shows a use of the variable cable receiving spaces resulting from the cable guide arrangement in accordance with the embodiment of FIG. 1 in which cables which have been inserted are likewise shown schematically by way of example.

As shown in FIG. 2, which gives one possible use by way of example, a cable 12a with a very large diameter, the largest generally being required when laying telephone cables, is inserted into the lower cable receiving space 22 of the cable guide arrangement 11 under the partition floor 17, such that the partition floor 17 is pressed all the way upwards and lies with the cable receiving guides 18, 19 against the upper region of the cable duct internal wall 23. As a result the upper cable receiving space 21 becomes very small, and can only take a cable 12b of relatively small cross section. In this case a light-conducting cable 13 is introduced or inserted into each of the two cable guide pipes 18, 19.

Figure 3:
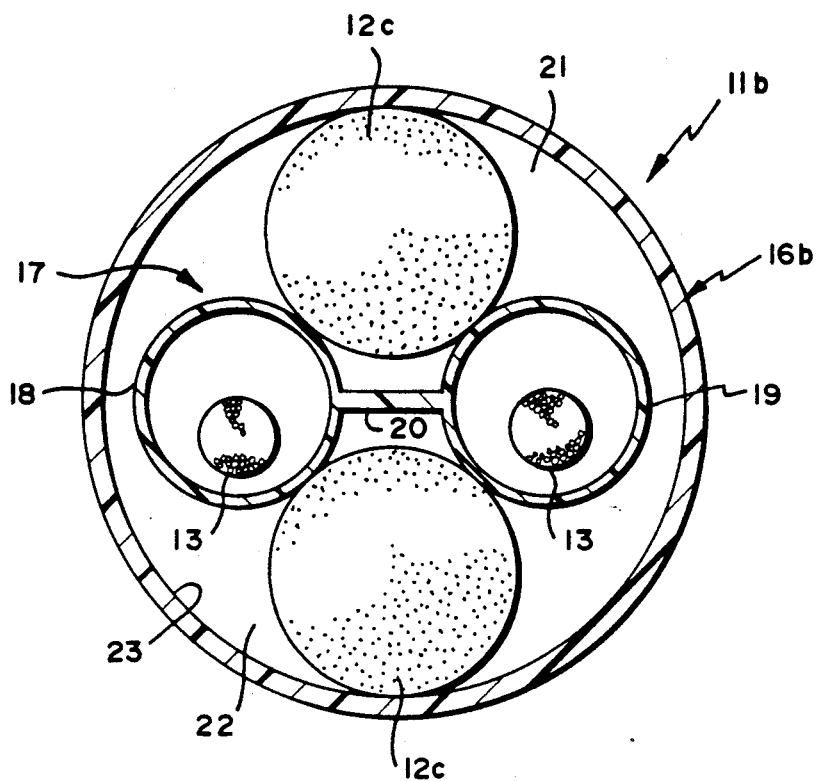
FIG. 3: which shows a variant use of the variable cable receiving spaces resulting from the cable guide arrangement of FIG. 1, in which cables which have been inserted are likewise shown schematically by way of example.

FIG. 3 shows another example of use, in accordance with a variant 11b, in which the distance X is somewhat smaller, because the cable duct 16b has a smaller internal diameter. In this example of use the two cable receiving spaces 21 and 22 are about the same size, which arises from the fact that, for example, initially a cable 12c of medium diameter is introduced into the lower cable receiving space 22, so that the upper cable receiving space 21 remains, which can receive a cable 12d of approximately the same diameter. It should be understood that the cable receiving spaces 21 and 22 can be used in any desired way and can be varied in size within the cable duct inner wall 23 in almost any desired way. Because of the distance X being smaller, this variant can be used even when thin cables are to be inserted.

In FIGS. 4A–4D are shown variants of the partition floor 17, which may be used in conjunction with the cable guide arrangement 11 and the width of which is in each case likewise smaller by the aforementioned amount X than the internal diameter of the cable duct 16. In the variant shown in FIG. 4A, the web 20a of the partition floor 17a may, for example, be provided centrally and on each face with semi-circular formations 26, 26a, so that a circular rib extends along the entire length thereof. A further variant lies in the shape of web 20b in FIG. 4B, in that the connecting web 20b of the partition floor 17b is provided with two such pairs of ribs 26, 26a distributed over the width of the web.

Figure 4A:
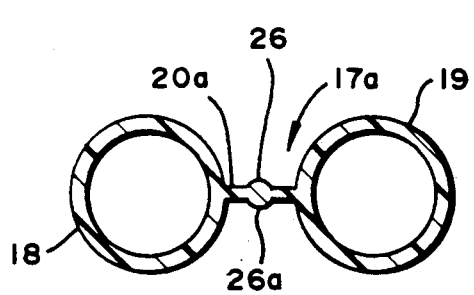
FIGS. 4A to 4D : which shows variants of the cable guide unit used with the cable guide arrangement of FIG. 1, each shown in schematic cross section.
Figure 4B:
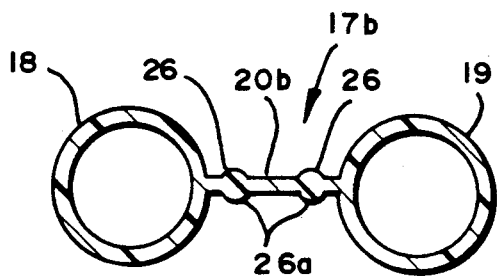
Figure 4C:
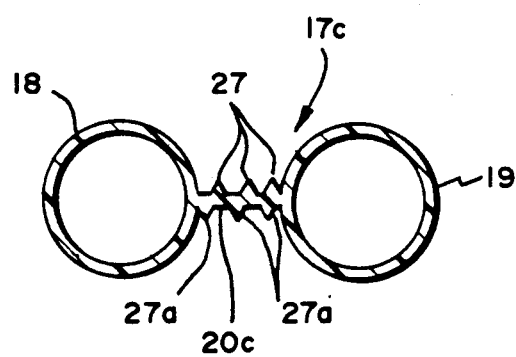
Figure 4D:
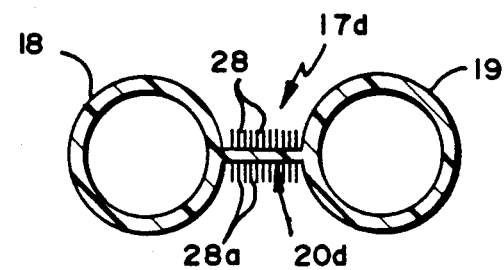

A further variant of the shape of the web 20c of FIG. 4C is that the connecting web 20c of the partition floor 17c is provided with upper and lower triangular ribs 27, 27a, with the upper and lower ribs 27, 27a each being arranged the same distance apart from one another, and the row of upper ribs 27 being staggered relative to the row of lower ribs 27a.

A further variation in the shape of the connection web 20d of the partition floor 17d lies in that its upper and lower faces are provided with fins 28, 28a, which lie opposite one another and which are thinner in construction than the pipes 18, 19 and the connecting web 20b.

Figure 5A:
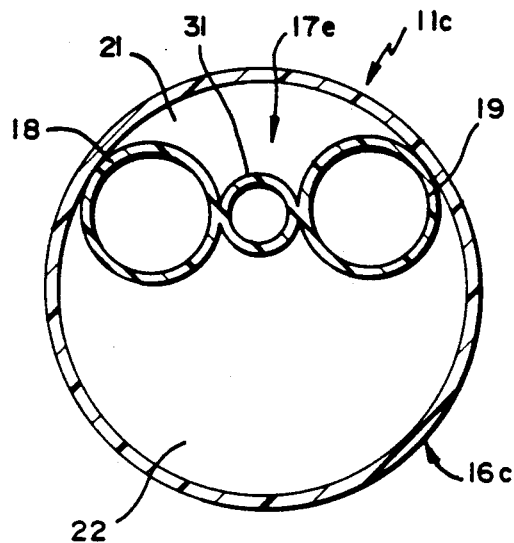
FIGS. 5A and 5B: which shows in schematic cross section, a cable guide arrangement in accordance with a second embodiment of the present invention and a variant thereof.
Figure 5B:
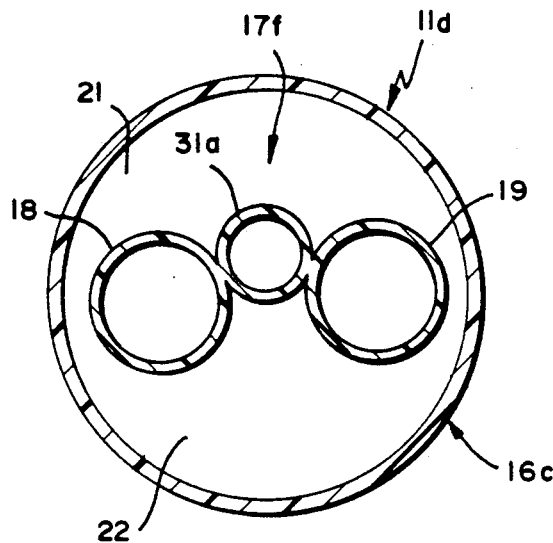

In the case of all of the variants of FIGS. 4A–4D, there is a lower friction during insertion of a cable below or above the partition floor 17, because the diameter of this cable is such that the outer wall of the cable 12 being inserted comes into contact with the connecting web 20. FIGS. 5A and 5B show cable guide arrangements 11c and 11d respectively, comprising a duct 16c, the diameter of which may be the same as or different to that of the duct 16 or 16a or 16b respectively of FIGS. 1 to 3, and a partition floor 17e or 17f. respectively, in which the two side cable guide pipes 18, 19 are rigidly connected to one another by a further cable guide pipe 31. While in the variant of FIG. 5A the further cable guide pipe 31 is arranged coaxially with the two side cable receiving pipes 18, 19, in the variant of FIG. 5B the horizontal axis of the further cable guide pipe 31a is displaced upwardly relative to the horizontal plane of the axes of the two pipes 18, 19. In both variants a light-conducting cable can be introduced into the further cable guide pipe 31 or 31a respectively. In the variant of FIG. 5B optimal use can thus, if necessary, be made of the lower cable receiving space 22.

Figure 6A:
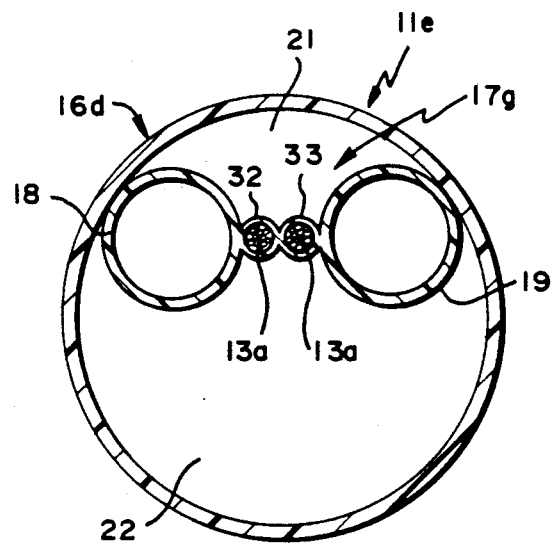
FIGS. 6A and 6B: which shows in schematic cross section a cable guide arrangement in accordance with a third embodiment of the present invention and a variant thereof.
Figure 6B:
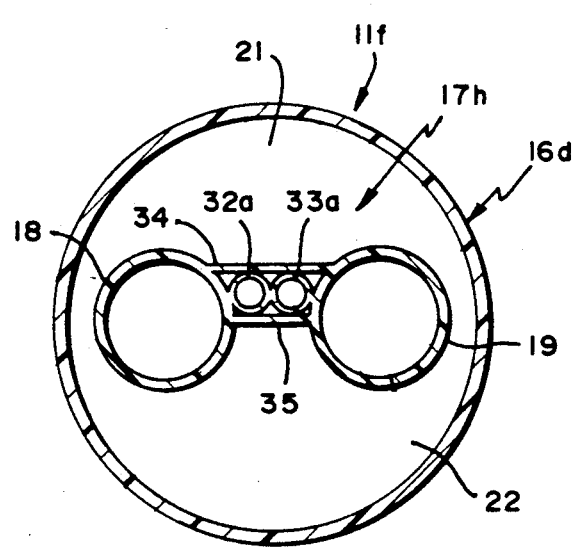

In the embodiment shown by way of example in the two variants in FIGS. 6A and 6B the cable guide arrangements 11e and 11f respectively likewise comprise a cable duct 16d and a partition floor 17g or 17h respectively, in which the two side cable receiving pipes 18, 19 are rigidly connected by two side-by-side abutting supplementary cable guide pipes 32, 33. While in accordance with FIG. 6A these two pipes 32, 33 lie in the same horizontal plane as the two side cable guide pipes 18, 19, the two pipes 32a and 33a in accordance with FIG. 6B are in a horizontal plane which is displaced upwardly relative to the side pipes 18, 19 and are additionally covered by upper and lower panels 34, 35. These two variants of the third embodiment in FIG. 6 are made so that a light-conducting cable 13a or 13b respectively is extruded simultaneously with each of the pipes 32, 33 or 32', 33' respectively, so that the pipes serve simultaneously as part of the protective coverings for such light-conducting cables.

It will be understood that also in the case of the embodiments and the variants of FIGS. 5A, 5B and 6A, 6B respectively, an appropriate amount X is left so that, as has been also illustrated therein, variable cable receiving spaces and 21 and 22 are provided.

I claim:

1. A cable guide arrangement for the combined laying and guiding of copper cables or the like and like-conducting cables, comprising:

a cable duct having an internal diameter; and
   a cable guide unit having two cable guide pipes connected side-by-side to one another, wherein:
   the two cable guide pipes are rigidly connected to one another to provide a partition floor within the cable duct;
   the width of the partition floor being less than the internal diameter of the cable duct;
   the width of the partition floor is such that the partition floor is movable within the cable duct so as to divide the space within the cable duct into two variable cable receiving spaces, said spaces being varied so as to prevent a cable laid in one of said spaces from becoming jammed between the internal wall of the cable duct and the adjacent outer surface of a guide pipe; and
   the cable guide pipes are rigidly connected by a web having an upper and lower surface and provided with one or more ribs on at least one surface thereof.

2. The cable guide arrangement as defined in claim 1, wherein the ribs are formed in a staggered relationship to one another on the upper and lower surface of the web.

3. A cable guide arrangement for the combined laying and guiding of copper cables or the like and light-conducting cables, comprising:

a cable duct having an internal diameter; and
   a cable guide unit having two cable guide pipes connected side-by-side to one another, wherein:
   the two cable guide pipes are rigidly connected to one another to provide a partition floor within the cable duct;
   the width of the partition floor being less than the internal diameter of the cable duct;
   the width of the partition floor is such that the partition floor is movable within the cable duct so as to divide the space within the cable duct into two variable cable receiving spaces, said spaces being varied so as to prevent a cable laid in one of said spaces from becoming jammed between the internal wall of the cable duct and the adjacent outer surface of a guide pipe; and
   the cable guide pipes are rigidly connected by a web having an upper and lower surface provided with perpendicularly projecting fins on at least one surface thereof.

4. The cable guide arrangement as defined in claim 3, wherein the web is provided on its upper and lower surface with perpendicularly projecting fins.

5. A cable guide arrangement for the combined laying and guiding of copper cables or the like and like-conducting cables, comprising:

a cable duct having an internal diameter; and
   a cable guide unit having two cable guide pipes connected side-by-side to one another, wherein:

the two cable guide pipes are rigidly connected to one another to provide a partition floor within the cable duct;

the width of the partition floor being less than the internal diameter of the cable duct;

the width of the partition floor is such that the partition floor is movable within the cable duct so as to divide the space within the cable duct into two variable cable receiving spaces, said spaces being varied so as to prevent a cable laid in one of said spaces from becoming jammed between the internal wall of the cable duct and the adjacent outer surface of a guide pipe; and the cable guide fins are rigidly connected by two spaced apart webs between which at least two further cable guide pipes are arranged.

6. A cable guide arrangement for the combined laying and guiding of copper cables or the like and light-conducting cables, comprising:

a cable duct having an internal diameter; and a cable guide unit having two cable guide pipes connected side-by-side to one another, wherein:

the two cable guide pipes are rigidly connected to one another to provide a partition floor within the cable duct;

the width of the partition floor being less than the internal diameter of the cable duct;

the width of the partition floor is such that the partition floor is movable within the cable duct so as to divide the space within the cable duct into two variable cable receiving spaces, said spaces being varied so as to prevent a cable laid in one of said spaces from becoming jammed between the internal wall of the cable duct and the adjacent outer surface of a guide pipe; and the cable guide pipes define a connection axis and are rigidly connected by a connecting element which is offset relative to said connection axis.

* * * * *